United States Patent [19]
Emanuel et al.

[11] 3,863,109
[45] Jan. 28, 1975

[54] SHORT CIRCUIT SENSING DEVICE FOR ELECTROMAGNETIC INDUCTION APPARATUS

[75] Inventors: Alexander E. Emanuel, Framingham; Jitendra P. Vora, Westboro, both of Mass.

[73] Assignee: High Voltage Power Corporation, Westboro, Mass.

[22] Filed: Aug. 27, 1973

[21] Appl. No.: 391,954

[52] U.S. Cl. ............... 317/14 R, 323/89 P, 336/73
[51] Int. Cl. ............................................ H02h 7/04
[58] Field of Search ............... 323/89 P, 8; 336/73; 317/14 R, 15

[56] References Cited
UNITED STATES PATENTS

| | | | |
|---|---|---|---|
| 1,692,486 | 11/1928 | Cohn | 336/73 X |
| 1,859,125 | 5/1932 | Bethenod | 317/14 R |
| 3,296,492 | 1/1967 | Drozdov et al. | 317/14 R |

*Primary Examiner*—James D. Trammell
*Attorney, Agent, or Firm*—Russell & Nields

[57] ABSTRACT

When an electromagnetic induction apparatus sustains an internal fault, such as shorted turns, a sensing device detects such fault and, in response thereto, disconnects the apparatus from a source of electrical power to thereby inhibit further damage to the apparatus. The apparatus, which may be a reactor or a transformer, includes a magnetic core, at least one winding disposed around the core and a yoke connected to the ends of the core for forming a low reluctance magnetic circuit. The sensing device includes at least one stray flux sensing coil and a relay which is activated by a voltage induced on the coil. The sensing coil is placed in relation to the magnetic circuit of the apparatus such that the coil is responsive to the stray flux. An internal fault within the apparatus, such as one or more shorted turns within the winding, creates a pattern of stray flux which is different from the flux pattern during normal conditions, and the coil has induced therein a voltage representative of this different stray flux pattern. This voltage then energizes the relay which disconnects the apparatus from the source of electrical power.

12 Claims, 17 Drawing Figures

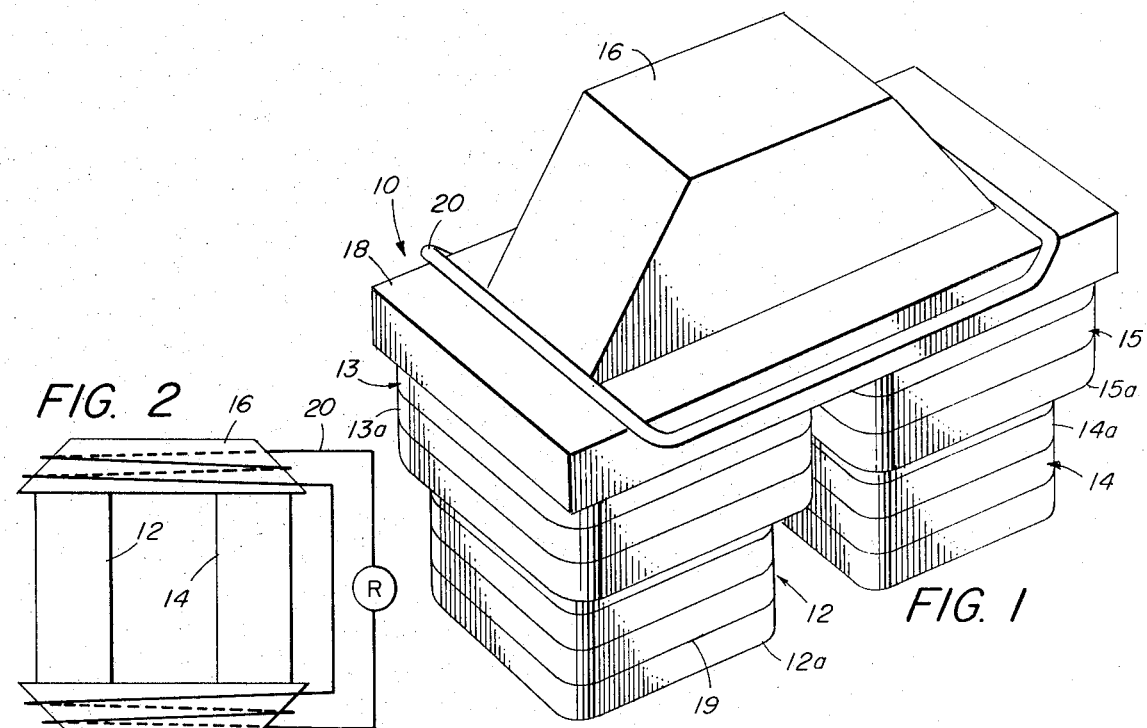
FIG. 1
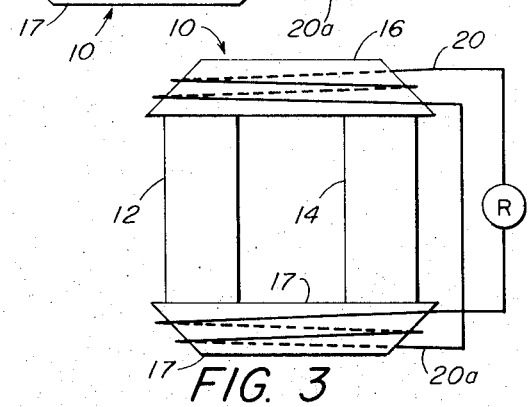
FIG. 2
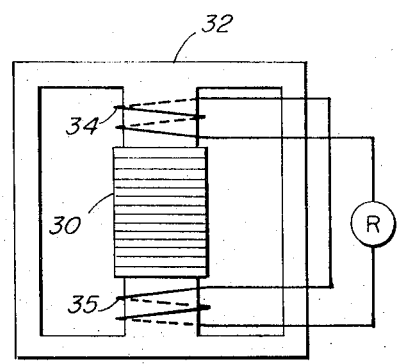
FIG. 4
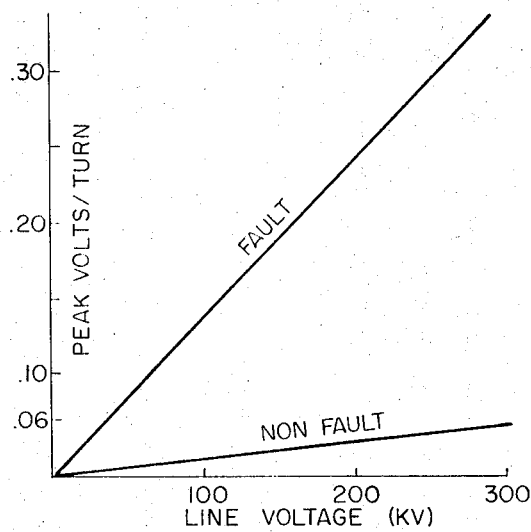
FIG. 3
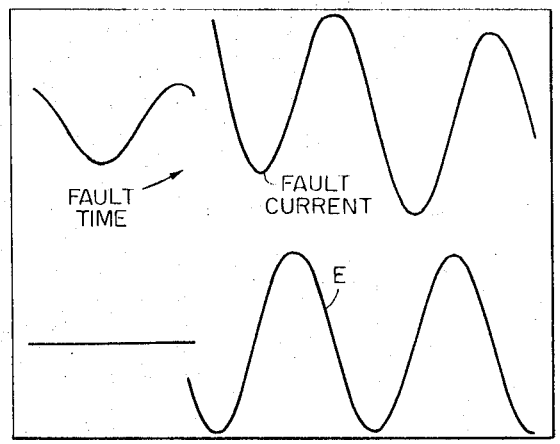
FIG. 5
FIG. 6

SHORT CIRCUIT SENSING DEVICE FOR ELECTROMAGNETIC INDUCTION APPARATUS

BACKGROUND OF THE INVENTION

The present invention relates to an electromagnetic induction apparatus, such as a transformer or a reactor, and, more particularly, to a circuit for sensing an internal fault within the apparatus and for disconnecting the apparatus from a source of electrical power.

A conventional reactor for electric power systems is primarily a high-voltage high-power inductance coil used primarily to constitute a lagging power factor load. For the most part such a reactor comprises a coil and a magnetic circuit so related as to exhibit high reactance with low resistance. Reactors are usually used as shunt reactors on long lines to compensate for line charging current. With the advent of EHV-UHV (defined as extra and ultra high voltage, and includes the range of 345-1,500 kilovolts in overhead systems and 230 kilovolts and up in underground systems), shunt reactors carry an increased importance. For example, in EHV-UHV systems, leading currents due to line capacitance can cause excessive voltages at the end of a long, lightly-loaded line. Unless prevented, these excessive voltages known as the Ferranti effect can create instabilities and subsequent failure in the terminal apparatus. Shunt reactors connected as required on the line end would have the desirable effect of preventing these instabilities and failures. Conventional shunt reactors were usually of the gapped core or air core type.

In its simplest form, a transformer consists of two conducting coils having high mutual inductance. The primary winding is that coil which receives electric power and the secondary winding is that coil which delivers the power induced therein by currents flowing through the primary winding. In normal practice these coils are wound on a core of magnetic material. The transformer design utilizes a magnetic circuit formed by an iron core which was designed for minimum reluctance in order that the magnetic circuit might indeed function as a "circuit" in which magnetic flux is confined as much as possible. The magnetic circuit was at a common potential, generally ground.

With the advent of EHV, there has been developed the insulating core electromagnetic induction apparatus; the U.S. Pat. No. 3,684,991 is one of several patents relating to insulating core concept. In this concept adjacent portions of the core and the coil are maintained close to the same potential irrespective of the voltage rating of the apparatus. This is done by separating the active or winding-bearing portion of the magnetic circuit into core elements, mounting them in a stack or column with each core element electrically insulated from its neighbor by an adequate but relatively thin layer of high quality dielectric. Each of these insulated magnetic core elements has in close proximity around it a proportional share of the total winding, with the mid-point or some other point in this local winding being electrically connected to its associated core section and firmly establishing its potential at all times. In this way the stack of insulated cores follows closely the potential distribution of the associated total winding and the electrical incompatibility of winding and core which characterizes the heretofore conventional transformer and reactor designs is almost totally avoided.

With all of these conventional and insulating core reactors and transformers, it is desirable to protect such apparatus from internal faults. For example, in shut reactors of modern day construction the required inductance is realized with coil turns numbering in the thousands. When a turn to turn fault develops, it is desirable to disconnect the device from the source of power before the fault progresses through a major section of the winding. The conventional relaying schemes and protections are not adequate to do this.

Failure detection of internal faults in oil filled terminal equipment in the incipient stage significantly reduces repair costs. Principal relays and systems in use for the protection of transformers and reactors are overcurrent relays, earthfault and impedance relays, differential systems and gas and pressure sensitive relays. These relays do not provide adequate protection against a turn to turn fault in shunt reactors. They lack in sensitivity and stability. A gas detector relay, a sudden pressure relay or a Buchholz relay does not sense a turn to turn fault until the accumulated gas volume and/or the created fault pressure reaches a certain threshold. Depending upon the energy involved in the fault, generally a large response time is required to operate the relays. In the meantime, a turn to turn fault will progress through a major section of the winding resulting in irreparable damage.

For a gas detector relay to operate effectively, the generated gases must pass through an oil barrier and get accumulated in the sensing region. For a sudden pressure relay to operate, strong pressure waves must be generated and sensed. Since a turn to turn fault in a reactor winding makes a small change in the winding impedance, the conventional impedance relays are ineffective as well. Therefore, an instantaneous responsve relay for turn to turn fault protection of electromagnetic induction apparatus is required.

SUMMARY OF THE INVENTION

In accordance with the present invention, a short circuit sensing device is provided for an electromagnetic induction apparatus, which device overcomes the problems previously mentioned. More particularly, the device is instantaneously sensitive to the variations in the flux pattern of the apparatus due to a fault condition, such as a shorted turn. In either a transformer or a reactor, the leakage flux drastically increases when one or more turns of a winding become shorted. Leakage increases because the shorted turns carry much larger currents which in turn tend to saturate the portion of the iron magnetic circuit near the shorted winding. Since the iron is saturated, it no longer provides a low reluctance path for the flux line, and thus leakage flux increases. The flux sensing device is disposed in the region where leakage flux responsive to shorted turns occurs, and the output of the device activates a control device which in turn disconnects the apparatus from the source of electrical power.

The type, shape and location of the flux sensing device depends somewhat on the kind of electromagnetic induction apparatus to be protected and on its geometry. Preferably, the sensing device is a coil which has induced therein a voltage proportional to the time rate of change of flux cutting the coil, but other flux sensitive devices, such as a Hall effect generator, which is responsive to the absolute value of flux density, may also be used. Single or polyphase transformers and reactors may be protected by the flux sensing device of the present invention. The invention is particularly adapted for use with the insulating core reactor because in such a reactor under normal operating conditions there is essentially no undesirable leakage flux. Thus, when leakage flux does occur in response to a short circuit, the flux sensing device is more readily sensitive to it. Several coil arrangements may be used. Reactors and transformers usually have a flux pattern which is symmetrical with respect to a plane passing through a geometrical center of the apparatus. It has been found that by placing one or more coils symmetrically across the plane, the abnormal leakage flux may be readily sensed because a short circuit destroys the symmetrical flux pattern. Two coils may also be used and, preferably, the coils are connected in series, either in an additive or differential mode, to provide a single net output signal representative of abnormal leakage flux. Preferably, two coils connected in a differential mode are used with apparatus having relatively large leakage flux in normal operating conditions; the conventional iron core transformer and the gapped core reactor are typical examples. In this case the voltages induced on the two coils due to the normal leakage flux are in an opposing sense and therefore cancel each other. There are several advantages of the short circuit sensing device of the present invention over previously known techniques. The flux sensing coil may respond simultaneously to abnormal leakage flux created by a single shorted turn. Conventional relaying devices may be used to disconnect the apparatus, and therefore the total response time is small enough to disconnect the apparatus before the damage to the apparatus increases. With the known devices, the fault had to progress through a major portion of the winding before the protective device responded. Additionally, the flux sensing technique has been found to be quite stable in that it is not responsive to transients, such as onrush current under system switching. Furthermore, the flux sensing device is easy to manufacture and install on the apparatus and is compatible with conventional relaying devices.

In one form of the invention, the protective device is a sensing coil which surrounds the periphery of a magnetic return yoke. The reactor has a pair of parallel, insulated magnetic cores and a pair of magnetic return yokes which provide a low reluctance path for the flux passing to and from the cores. Under no-fault conditions, the flux lines cutting the coil in one direction equals the flux cutting the coil in the other direction; thus, no EMF is induced in the coil. The stray flux pattern from one core to the other is symmetrical. When an internal fault occurs, such as shorted turns or shorted core elements, the stray flux pattern becomes unsymmetrical and this new pattern is detected by the coil because there is an unsymmetrical flux pattern within the magnetic return yoke. The induced EMF in the coil energizes a voltage relay which disconnects the reactor from the lines.

In this embodiment the sensing coil encloses the absolute value of the total flux of the magnetic circuit twice. Each absolute value of total flux in the magnetic circuit induces a large voltage on the sensing coil. However, since the two absolute values of total flux are in opposite directions with respect to the sensing coil, two large voltages of opposite polarity are induced in the sensing coil. Thus, under normal conditions the net voltage in the sensing coil is zero. Under a fault condition, the two absolute values of total flux differ slightly, and this difference is detected by the sensing coil. Thus, the sensing coil detects slight variations between two large values of flux.

In other embodiments of the invention, each of the return yokes may have a sensing coil disposed therearound. These coils may be series connected in either an additive or substractive mode.

BRIEF DESCRIPTION OF THE DRAWINGS

In the drawings:

FIG. 1 is a perspective view of a reactor with portions removed having a sensing coil disposed around one magnetic return yoke in accordance with the present invention;

FIG. 2 is a diagram of a reactor having a pair of sensing coils in a differential mode;

FIG. 3 is a diagram of a reactor having a pair of sensing coils in an additive mode;

FIG. 4 is a diagram of an alternative form of reactor having one magnetic core and a pair of sensing coils disposed thereon in a differential mode;

FIG. 5 is a graph depicting the sensitivity of the sensing coil for fault and no fault conditions over a range of reactor voltages;

FIG. 6 are expected measured waveforms of current and voltage depicting the response time of the sensing coil to a fault condition;

FIG. 12b is a schematic diagram of the reactor in FIG. 12a;

FIG. 13b is a schematic diagram of the reactor in FIG. 13a;

DESCRIPTION OF PREFERRED EMBODIMENTS

Figure 7:
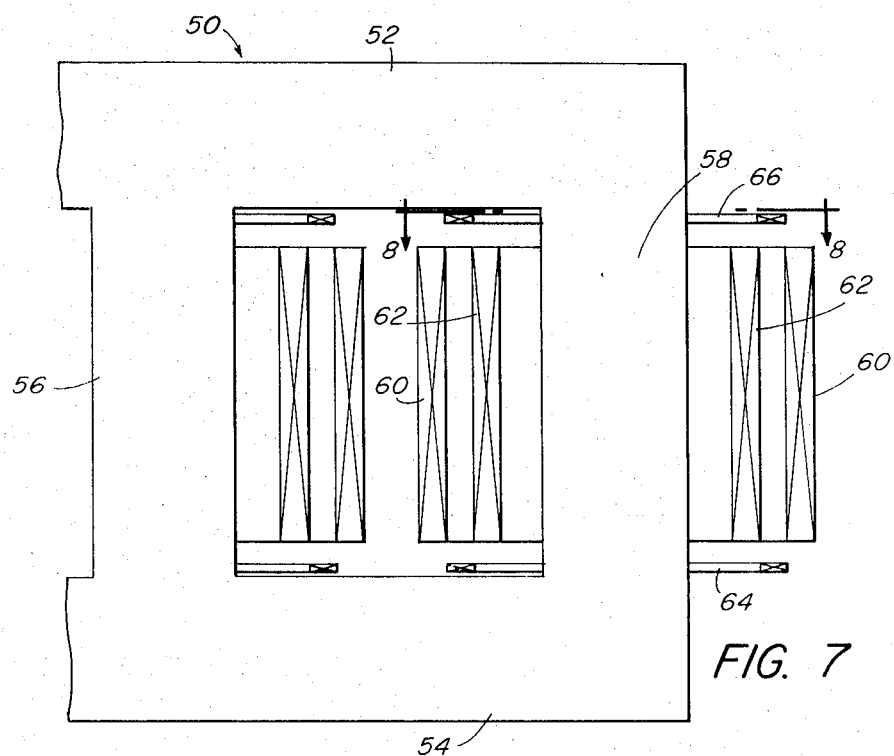
FIG. 7 is a diagram of a transformer having short circuit sensing coils disposed thereon in accordance with the present invention.

FIG. 1 shows the use of a sensing coil according to the present invention on a single phase insulating core reactor. It is to be understood, however, that the invention is applicable to any type of reactor or transformer, whether single or polyphase.

Referring now to FIG. 1, some of the details of the insulating core reactor are shown. A high voltage reactor, represented generally by the reference numeral 10, includes a pair of cores, represented generally by the reference numerals 12 and 14, and a magnetic return yoke 16. The lower portions of the cores 12 and 14 are in turn connected to a lower magnetic yoke 17 (shown in FIGS. 12 and 13). Each of the cores 12 and 14 comprises a plurality of separate cores 12a and 14a, respectively. A pair of windings 13 and 15 are disposed around the cores 12 and 14, respectively. The windings have a plurality of separate winding elements 13a and 15a, respectively. In FIG. 1 the lowermost core elements are shown with the winding elements removed. A dielectric material is disposed between the cores 12a and 12b as shown at 19. The magnetic return yoke 16, which is preferably a laminated electrical steel, provides a low reluctance path for the flux leaving one core and entering the other. The magnetic return yoke 16 has a support member 18 disposed above the cores 12 and 14. This member is suitably fastened, such as by tie bolts not shown, to a similar member at the lower end of the reactor.

In accordance with the present invention, a sensing coil 20 is disposed around the outer periphery of the magnetic return yoke 16 and as near as possible to the intersection of the upper ends of the cores 12 and 14. As a matter of convenience, the coil 20 is wrapped around a portion of the support member 18.

It is desirable to utilize a clamping structure which holds the coil 20 secure with respect to the yoke 16. One suitable structure is a non-magnetic shell (not shown) which is attached to the coil and which is formed to fit over at least a portion of the yoke 16 and the support member 18. The coil 20 is formed by the appropriate number of turns of insulated wire; the wire may be of very small size because it is desirable to keep the overall diameter of the coil small and the coil itself does not carry large currents.

Figure 12A:
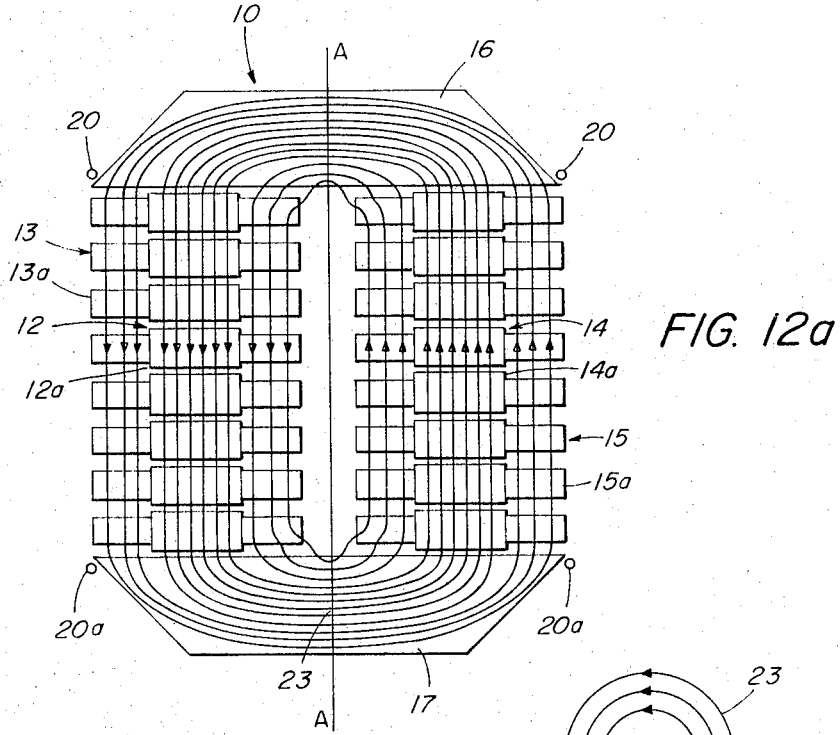
FIG. 12a is a diagram showing the flux pattern under normal conditions of the insulating core reactor shown in FIG. 1.

FIG. 12a shows the distribution of flux in the insulating core reactor of FIG. 1 under normal no-fault conditions and also the complete reactor assembly. It should be noted that the flux distribution is symmetrical about a plane A—A drawn through the center of the reactor. The magnetic cores 12 and 14 each comprise a series of core elements 12a and 14a, respectively. The space 19 between the core elements is filled with a dielectric material. The sensing coil 20 is shown in FIG. 12a as extending around the lower section of the yoke 16. Similarly, a lower sensing coil 20a is located around the upper portion of a yoke 17.

Figure 12B:
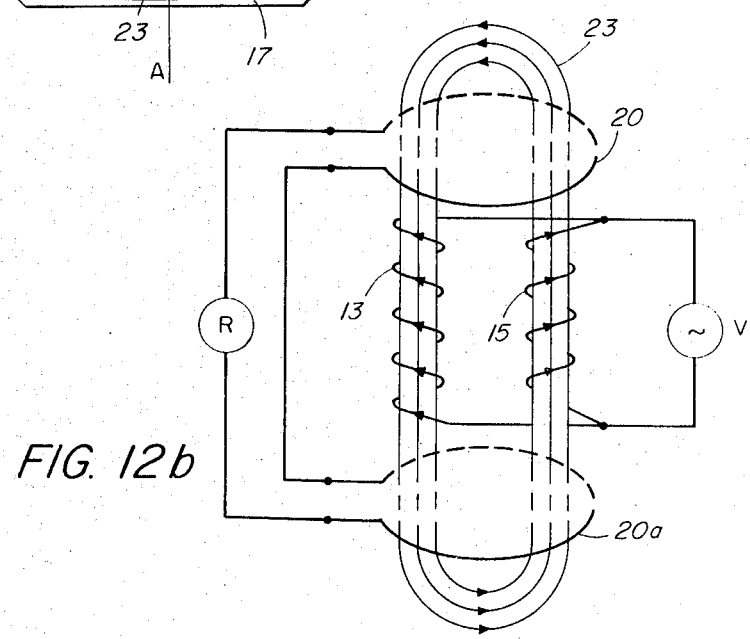

Referring now to FIG. 12b, there is provided an electrical schematic diagram of the insulating core reactor previously described in FIGS. 1 and 12a. Each of the windings 13 and 15 of the shunt reactor is connected to a source V of high voltage. Preferably, these windings are connected in parallel as shown in FIG. 12b. The flux created by the current in these windings is represented generally by the reference numeral 23. These flux lines all pass twice within each of the coils 20 and 20a, but the orientation of the flux in each case is opposed. The voltage E induced on these coils is therefore initially zero, and the relay R is therefore not energized. The relay R has contacts (not shown) connected in series with the lines from the source V and the windings 13 and 15.

Figure 13A:
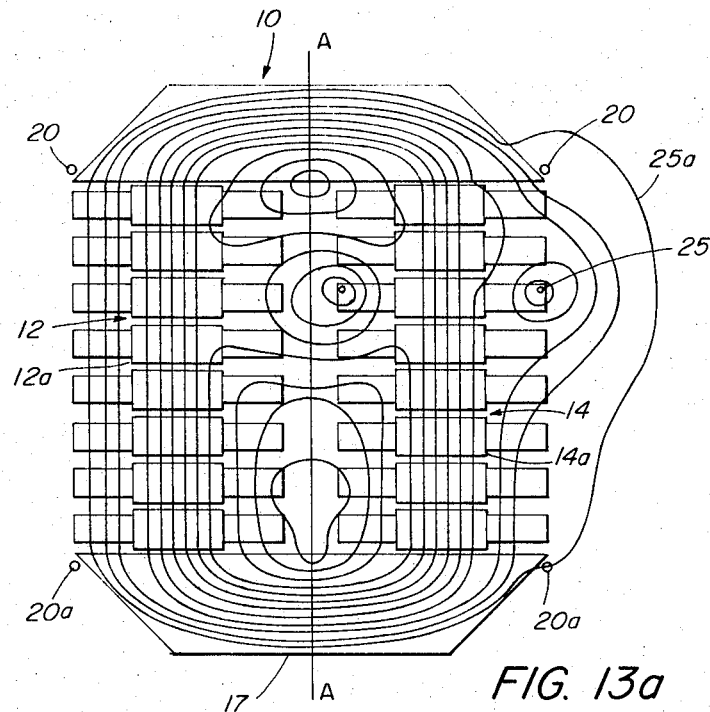
FIG. 13a is a diagram showing the flux pattern under a fault condition of the insulating core reactor in FIG. 1.
Figure 13B:
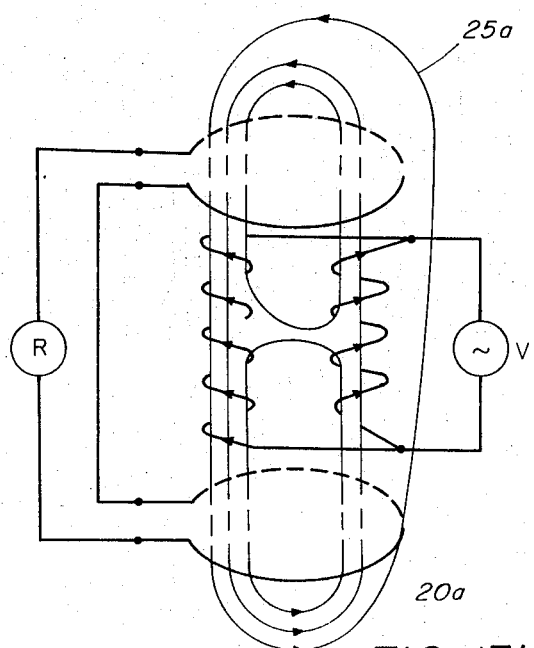

Referring now to FIG. 13a, there is shown a flux distribution which occurs when the insulating core reactor has a shorted turn represented generally by the numeral 25. It should now be noted that the flux distribution path is no longer symmetrical with respect to the plane A—A. FIGS. 13a and b show that this non-symmetrical flux pattern is detected by the sensing coil arrangement of the present invention. Here, some of the flux does not pass totally within the sensing coil 20. Particularly, one flux line passes to the right of the right side of coil 20, as shown in FIGS. 13a and b.

The sensor coil principle as related to this shunt reactor is as follows. In shunt reactors, designs of which are based upon the insulating core principle, a close magnetic coupling between coils and cores is maintained. The distributed ampere-turns and the balanced gapped reluctance within the magnetic circuit provide negligible stray flux. The resultant magnetic flux within each gapped core column is the same. The unit fashions itself to be a toroidal inductor. Consequently under normal operating conditions of the reactor effective induced voltage across the terminals of the sensing coil is essentially zero. Total flux entering the loop is equal to that leaving the loop.

When a turn to turn fault develops, a magnetic disturbance occurs instantaneously and the flux distribution balance is spoiled. Across the terminals of the sensor coil an emf is developed. Conventional voltage actuated relays can be operated to sense the disturbance. The sensor coil principle can be effectively utilized for three phase shunt reactors as well. A differential arrangement of sensor coils in each phase of the reactor will be required.

The voltage induced on the coil is defined as follows:

$$V = NA \, dB/dt \times 10^{-8} \text{ volts}$$

where
$N =$ number of turns in the coil
$A =$ cross-sectional area in cm$^2$ defined by the perimeter of the coil
$dB/dt =$ the time rate of change of stray flux density in gauss/sec.

Under normal conditions the $dB/dt$ is zero because the number of flux lines entering the yoke equals the number leaving the yoke. The entire flux pattern is symmetrical. It should be noted that each coil 20 and 20a is operated in a differential mode. The flux entering and leaving the yoke each induces a large signal due to its $dB/dt$, but these signals are of opposite polarity and therefore cancel each other. In addition, the coils may be connected in series with each other in either a subtractive or additive mode.

When an internal fault occurs, such as a short circuit turn to turn or core element to core element, the flux pattern becomes non-symmetrical. When turns become shorted, the MMF of the faulted winding becomes less than the other winding. When core elements become shorted, the flux pattern breaks away from the toroidal configuration. Either fault causes an unbalance between the flux entering and leaving the yoke. The coil is connected to a suitable device, such as the relay R, in FIGS. 12b and 13b, which in turn disconnects the windings of the reactor from the source of electrical power.

Referring now to FIGS. 2 and 3, there is shown in diagrammatic form the complete reactor 10 which includes the pair of yokes 16 and 17 and a pair of cores 12 and 14 with windings disposed therearound. In addition to the coil 20 around the yoke 16, the yoke 17 also has the coil 20a disposed therearound. These coils 20 and 20a are preferably connected in series so that their combined output controls the relay R. In FIG. 2 the coils are connected in an opposed sense, whereas in FIG. 3 the coils are in an additive sense. The use of two coils provides a more precise capability to sense the flux symmetry.

Referring now to FIG. 4, an alternative form of reactor is shown wherein a single insulated core 30 is disposed within a return yoke 32. Here a pair of sensing coils 34 and 36 are disposed around the portion of the yoke 32 immediately adjacent the ends of the insulated core 30. Here a double sensing coil in an opposed series connected sense is necessary because under normal conditions each coil is cut by the flux passing through the core. In the other embodiments, the coil is removable since it merely fits over a portion of the reactor; in FIG. 4, however, the coil is wound in place on the reactor.

Referring now to FIG. 7, an alternative form of the present invention is shown wherein a sensing coil is used on a transformer. A transformer 50 is shown therein with portions not shown. The core of the transformer 50 includes a pair of flux return yokes 52 and 54 and a pair of magnetic cores 56 and 58. A high voltage coil 60 and a low voltage coil 62 are disposed about the core 58. Preferably, these coils are mounted concentric with each other. In accordance with the present invention, a pair of sensing coils 64 and 66 are located at the lower and upper extremities of the core 58. Preferably, the circumference of these sensing coils, as shown in FIGS. 7 and 8, coincides with the space between the high and low voltage coils 60 and 62.

Figure 8:
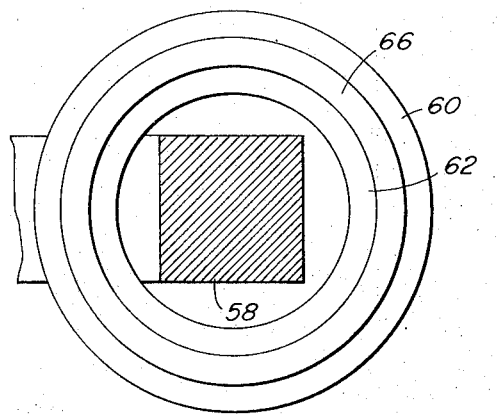
FIG. 8 is a sectional view taken along lines 8—8 of FIG. 7.
Figure 9:
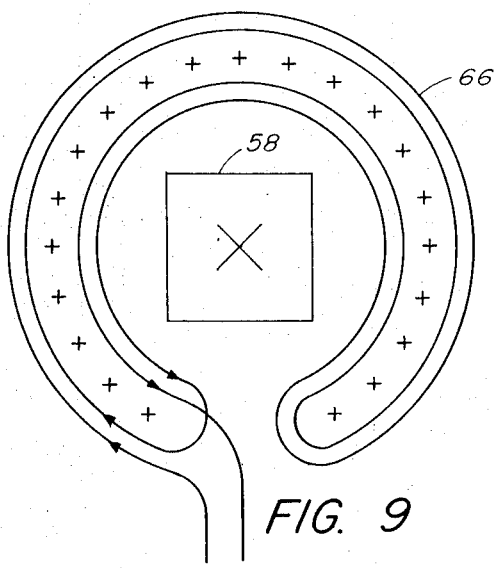
FIG. 9 is a schematic diagram showing the details of one of the sensing coils of FIGS. 7 and 8.
Figure 10:
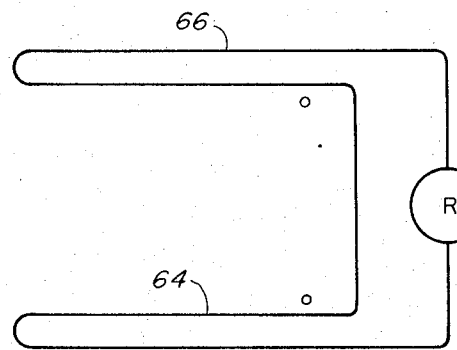
FIG. 10 is a schematic diagram showing the connection of the sensing coils of FIG. 7 in a differential mode.
Figure 14:
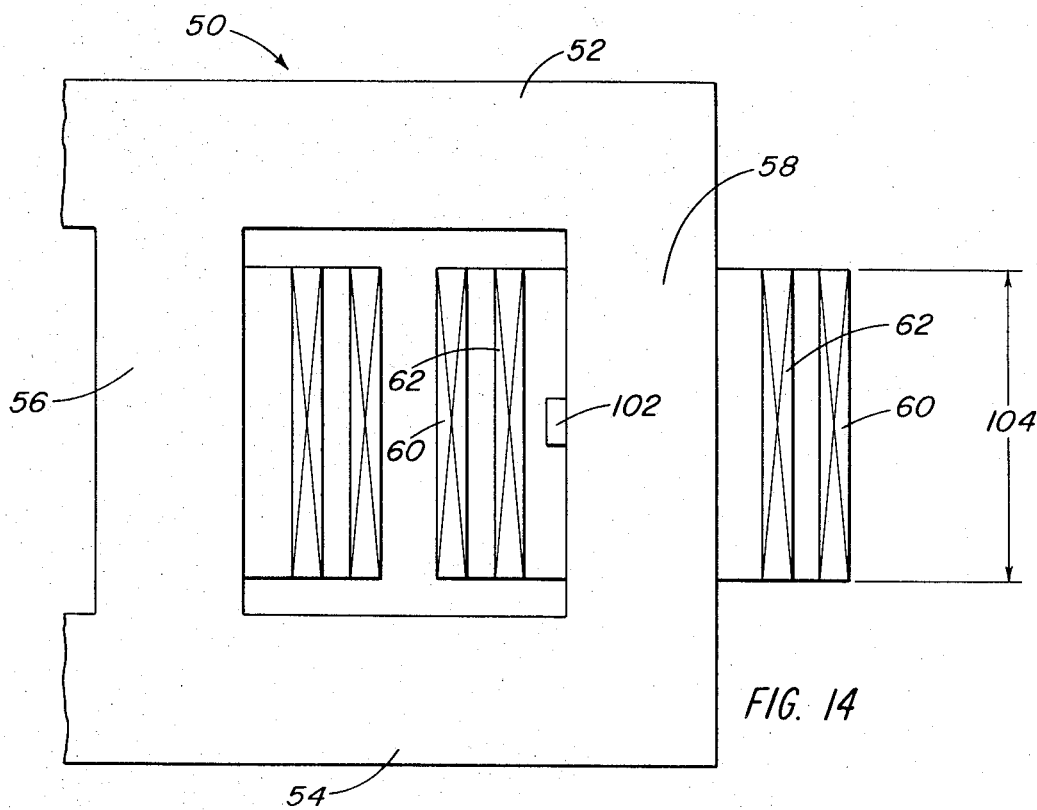
FIG. 14 is a diagram of a transformer having a Hall effect generator placed as the sensing element in accord with the present invention.
Figure 15:
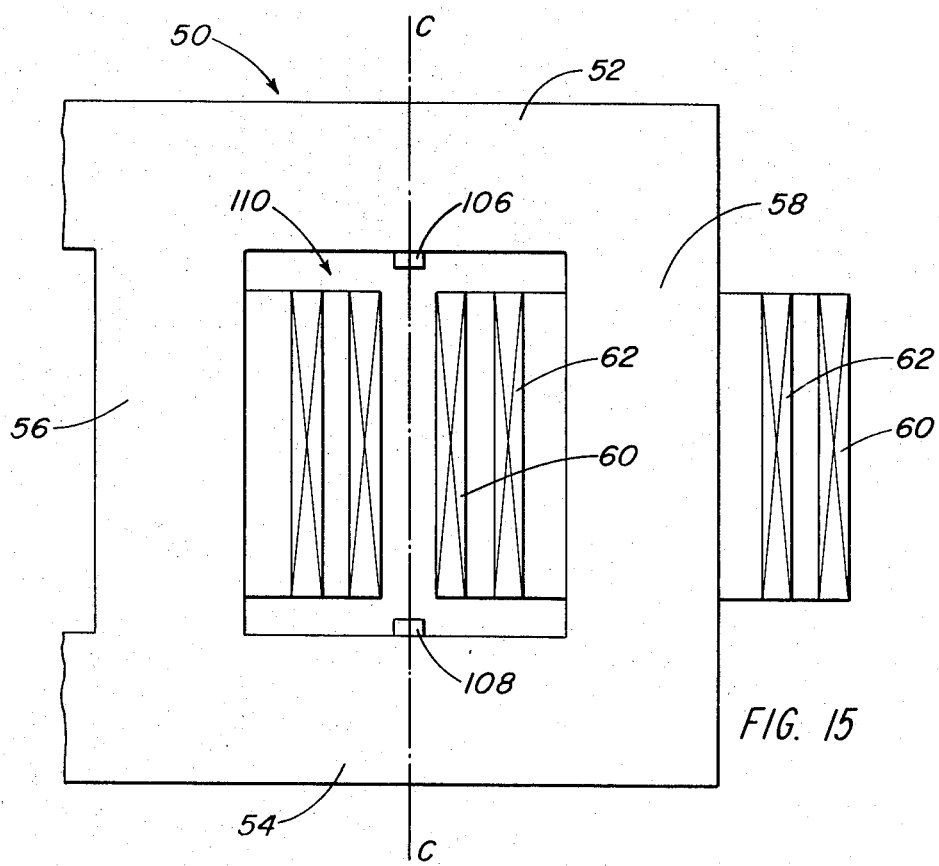
FIG. 15 is a diagram of a transformer having two Hall effect generators placed in a differential mode as sensing elements in accord with the present invention.

FIG. 9 is a schematic diagram showing the preferred method of winding the sensing coil used on the transformers shown in FIGS. 7 and 8. It is to be noted that, due to the manner in which this coil is wound, the main flux passing through the core 58 does not induce an EMF on the sensing coil. It is only the stray flux which induces a voltage on this coil. The coil is wound in a generally C-shaped configuration. The net result is that there is no turn of the sensing coil which completely surrounds the core element 58. This arrangement thereby prevents the main flux passing through the magnetic core from predominating the signal generated on the sensing coil. In FIG. 10 it may be observed that the two sensing coils 64 and 66 are connected in a series differential mode. A differential connection of two sensing coils is particularly effective for the relatively high stray flux electromagnetic induction apparatus, such as the conventional reactor and transformer. Referring now to FIGS. 14 and 15, two further alternative forms of the present invention are shown wherein one (FIG. 14) or two (FIG. 15) Hall effect generators are used as sensing elements on a transformer. As in FIG. 7 a transformer indicated at 50 is depicted in both FIG. 14 and FIG. 15. The core of each of these transformers includes a pair of flux return yokes 52 and 54 and a pair of magnetic cores 56 and 58. A high voltage coil 60 and a low voltage coil 62 are disposed about the core 58 in both FIG. 14 and FIG. 15. Preferably, these coils are mounted concentric with each other. In accordance with the present invention, a single Hall effect generator 102 may be centrally mounted on magnetic core 58 relative to the coil width indicated at 104 in FIG. 14. This configuration will sense the x-component of the magnetic field, and will clearly experience zero average flux density along its section so long as normal symmetrical flux patterns prevail. Similarly, as indicated FIG. 15, two Hall effect generators 106 and 108 may be placed on the yoke side of the window indicated at 110, to sense the y-component of the field. It should also be noted that in this configuration, (1) differential connection of the Hall effect generators will assure zero output signal under normal operation, and (2) the generator pair 106 and 108 can offer simultaneous service for phase windings around both cores 56 and 58 if mounted on the axis of symmetry $c-c$. In either configuration a variation in flux pattern will activate the relay as required by the present invention.

Figure 11:
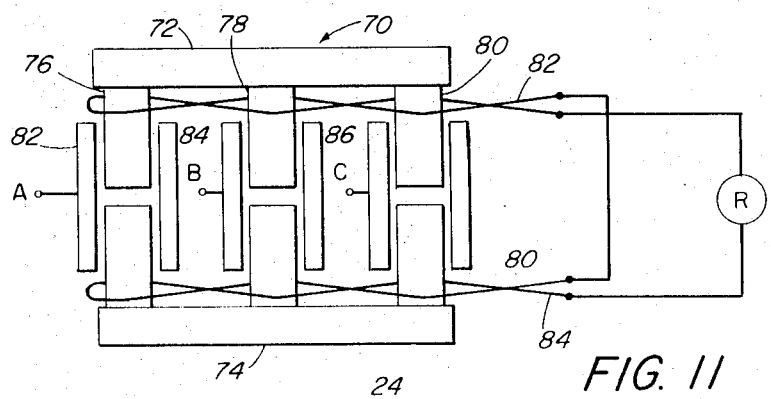
FIG. 11 is a diagram of a three-phase reactor having short circuit sensing coils disposed thereon in accordance with the present invention.

Referring now to FIG. 11, it may be observed that the sensing coil of the present invention may be used as a protective device for a polyphase electromagnetic induction apparatus, such as a three phase gapped core reactor. A reactor represented by the reference numeral 70 includes a pair of flux return yokes 72 and 74 and three gapped core elements 76, 78 and 80. A group of three windings 82, 84 and 86 are disposed around the core elements 76, 78 and 80, respectively. A pair of sensing coils 82 and 84 are wound respectively along the upper and lower portions of the core elements in the manner shown in FIG. 11. Each sensing coil is in turn connected in a differential mode.

FIG. 5 shows the difference in voltage induced on the coil for fault and no fault conditions over a typical range of operating voltages for an insulating core reactor shown in FIGS. 1, 12 and 13.

The response time of the induced voltage on the sensing coil to a shorted winding turn fault is instantaneous because of the electromagnetic coupling between the sensing coil and faulted winding. The total response time is decided by the input impedance of the relay, the impedance of connection wire and mechanical inertia of the breaker.

A test was conducted on a small reactor of the type shown in FIGS. 1, 12 and 13. A simulated turn to turn fault was introduced and FIG. 6 shows the effect that this fault had on the current in the winding and voltage in the sensing coil. In the Figure winding current and sensing coil voltage are shown with respect to time. Before the fault was introduced, the voltage E in the sensing coil is zero; the fault created an unsymmetrical flux pattern which induced the signal on the sensing coil. The winding current increased as a result of the fault. The response time for the detection of the fault was instantaneous.

In its broadest aspect the present invention covers any device whereby fault conditions within an electromagnetic induction apparatus, such as single or polyphase reactors or transformers, are sensed by monitoring directly the difference in otherwise symmetrical flux patterns.

We claim:

1. An electromagnetic induction apparatus comprising a magnetic circuit, at least one winding having a number of turns placed around said magnetic circuit, said winding being adapted to have current produced therein by a source of electrical power, said current passing through said winding creating a flux pattern which passes predominantly through said magnetic circuit, said flux pattern varying in response to shorted turns within said winding to create a greater proportion of leakage flux, stray flux sensing means responsive only to said flux pattern variation for generating a signal proportional to said flux pattern variation, and means responsive to said signal for rendering said source inoperative to produce said current, thereby protecting said apparatus from further damage.

2. The apparatus according to claim 1 wherein said flux sensing means includes at least one Hall effect generator.

3. The combination of a high voltage electromagnetic induction apparatus having at least one magnetic core comprising a series of similar core elements separated by a series of similar electrically insulating layers, at least one magnetic yoke magnetically connecting the ends of said core, and at least one winding surrounding said magnetic core, and adapted to have current produced therein by a source of electrical power, said winding being electrically connected to each of said core elements at respective neighboring portions thereof, said apparatus having a plane on either side of which there is a symmetrical flux pattern during normal condition and wherein under conditions of fault the flux pattern on either side of said plane are not symmetrical, coil means for sensing only the degree of non-symmetry between the flux pattern on either side of said plane, means connected to said coil means for rendering said source inoperative to produce said current thereby protecting said apparatus from further damage.

4. The combination of a high voltage reactor having at least two magnetic cores, each of said magnetic cores comprising a series of similar core elements separated by a series of similar electrically insulating layers, a pair of yokes connected to the ends of the cores to form a magnetic circuit, at least one winding surrounding each of said cores, said winding being electrically connected to each of said core elements at respective neighboring portions thereof, said windings being adapted to have current produced therein by a source of electrical power, said reactor having symmetrical flux patterns on either side of a plane passing through said yokes under normal conditions and having non-symmetrical flux patterns when portions of said windings become shorted, coil means for sensing only the degree of non-symmetry between the flux patterns on either side of said plane and generating a signal in response thereto and means responsive to said signal for rendering said source inoperative to produce said current, thereby protecting said reactor from further damage.

5. The combination according to claim 4 wherein said coil means includes a coil disposed around the outer periphery of one of said magnetic yokes, said coil having induced thereon voltage proportional to the difference between the flux entering and leaving said yoke.

6. The combination according to claim 4 wherein said coil means encloses the absolute total value of flux in said magnetic circuit twice.

7. A transformer comprising
a magnetic circuit,
a low voltage winding having a number of turns disposed around a portion of said magnetic circuit,
a high voltage winding having a number of turns disposed around a portion of said magnetic circuit,
both said low voltage and said high voltage windings being adapted to have current produced therein by a source of electrical power,
said current passing through said windings creating a flux pattern which passes predominantly through said magnetic circuit,
said flux pattern varying in response to shorted turns within said windings to create a greater portion of leakage flux,
flux sensing means responsive to said flux pattern variation for generating a signal proportional to said flux pattern variation,
said flux sensing means including a pair of sensing coils surrounding a portion of said magnetic circuit and adjacent to respective opposite sides of said windings,
said coils being wound in a C configuration around said magnetic circuit and having induced thereon a voltage representing the leakage flux adjacent to said circuit, and
means responsive to said signal for rendering said source inoperative to produce said current, thereby protecting said transformer from further damage.

8. The apparatus according to claim 7 wherein said coils are connected in series opposition.

9. A three phase reactor comprising
three gapped magnetic cores,
a winding having a number of turns disposed around each of said cores,
said windings being adapted to have current produced therein by a source of electrical power,
said current passing through each of said windings creating flux patterns which pass predominantly through said magnetic cores,
said flux patterns varying in response to shorted turns within said windings to create a greater portion of leakage flux,
a first return yoke connecting one of the ends of said cores,
a second return yoke connecting the other end of said cores,
flux sensing means responsive to said flux pattern variation for generating a signal proportional to said flux pattern variation,
said flux sensing means including a first sensing coil disposed around said cores between said first yoke and said windings, and a second sensing coil disposed around said cores between said second yoke and said windings, said coils being connected in a series differential configuration, and
means responsive to said signal for rendering said source inoperative to produce said current, thereby protecting said apparatus from further damage.

10. The combination of a high voltage reactor having at least two magnetic cores, each of said magnetic cores comprising a series of similar core elements separated by a series of similar electrically insulating layers, a pair of yokes connected to the ends of the cores to form a magnetic circuit, at least one winding surrounding each of said cores, said winding being electrically connected to each of said core elements at respective neighboring portions thereof, said windings being adapted to have current produced therein by a source of electrical power, said reactor having symmetrical flux patterns on either side of a plane passing through said yokes under normal conditions and having non-symmetrical flux patterns when portions of said windings become shorted, coil means for sensing only the degree of non-symmetry between the flux patterns on either side of said plane and generating a signal in response thereto, said coil means including a first coil disposed around the outer periphery of one of said magnetic yokes, a second coil disposed around the outer periphery of the other of said magnetic yokes, each of said coils having induced thereon voltage proportional to the difference between the flux entering and leaving its respective yoke, said coils being connected in series to form a single output, and means responsive to said signal for rendering said source inoperative to produce said current, thereby protecting said reactor from further damage.

11. The combination according to claim 10 wherein said coils are series connected in an additive mode.

12. The combination according to claim 10 wherein said coils are series connected in a subtractive mode.

* * * * *